(12) United States Patent
Choi et al.

(10) Patent No.: US 11,355,739 B2
(45) Date of Patent: Jun. 7, 2022

(54) PASSIVATION OF LITHIUM METAL BY TWO-DIMENSIONAL MATERIALS FOR RECHARGEABLE BATTERIES

(71) Applicant: University of North Texas, Denton, TX (US)

(72) Inventors: Wonbong Choi, Coppell, TX (US); Eunho Cha, Denton, TX (US)

(73) Assignee: University of North Texas, Denton, TX (US)

( * ) Notice: Subject to any disclaimer, the term of this patent is extended or adjusted under 35 U.S.C. 154(b) by 267 days.

(21) Appl. No.: 16/482,372

(22) PCT Filed: Feb. 9, 2018

(86) PCT No.: PCT/US2018/017585
§ 371 (c)(1),
(2) Date: Jul. 31, 2019

(87) PCT Pub. No.: WO2018/148518
PCT Pub. Date: Aug. 16, 2018

(65) Prior Publication Data
US 2020/0028149 A1    Jan. 23, 2020

Related U.S. Application Data

(60) Provisional application No. 62/526,665, filed on Jun. 29, 2017, provisional application No. 62/457,488, filed on Feb. 10, 2017.

(51) Int. Cl.
*H01M 4/133* (2010.01)
*H01M 4/38* (2006.01)
(Continued)

(52) U.S. Cl.
CPC ......... *H01M 4/0426* (2013.01); *C01B 32/158* (2017.08); *C01B 32/182* (2017.08);
(Continued)

(58) Field of Classification Search
None
See application file for complete search history.

(56) References Cited

U.S. PATENT DOCUMENTS

| 5,147,739 A | 9/1992 | Beard |
| 6,537,701 B1 * | 3/2003 | Nimon ............ H01M 4/58 |
| | | 429/231.95 |

(Continued)

FOREIGN PATENT DOCUMENTS

| JP | H04248276 A | 9/1992 |
| JP | 2014203593 A | 10/2014 |

(Continued)

OTHER PUBLICATIONS

European Patent Office, Communication, Extended European Search Report issued for European Patent Application No. 18751759.4, dated Feb. 22, 2021, 12 pages.

(Continued)

*Primary Examiner* — Tracy M Dove
(74) *Attorney, Agent, or Firm* — Norton Rose Fulbright US LLP

(57) ABSTRACT

The present application relates to methods for depositing two-dimensional materials (e.g., $MoS_2$, $WS_2$, $MoTe_2$, $MoSe_2$, $WSe_2$, BN, BN—C composite, and the like) onto lithium electrodes. Battery systems incorporating lithium metal electrodes coated with two-dimensional materials are also described. Methods may include intercalating the two-dimensional materials to facilitate flow of Lithium ions in and out of the lithium electrode. Two-dimensional material coated lithium electrodes provide for high cycling stability and significant performance improvements. Systems and methods further provide electrodes having carbon structures (e.g., carbon nanotubes (CNTs), graphene, porous carbon, free-standing 3D CNTs, etc.) with sulfur coatings.

20 Claims, 12 Drawing Sheets

(51) Int. Cl.
  *H01M 4/134* (2010.01)
  *H01M 4/04* (2006.01)
  *C01B 32/182* (2017.01)
  *C01B 32/158* (2017.01)
  *H01M 4/1393* (2010.01)
  *H01M 10/0525* (2010.01)

(52) U.S. Cl.
  CPC .......... *H01M 4/133* (2013.01); *H01M 4/134* (2013.01); *H01M 4/1393* (2013.01); *H01M 4/382* (2013.01); *H01M 10/0525* (2013.01)

(56) References Cited

U.S. PATENT DOCUMENTS

| | | | |
|---|---|---|---|
| 10,629,320 B2 * | 4/2020 | Haag | C01B 32/178 |
| 2009/0325071 A1 | 12/2009 | Verbrugge et al. | |
| 2011/0165462 A1 | 7/2011 | Zhamu et al. | |
| 2013/0171355 A1 | 7/2013 | Wang et al. | |
| 2013/0202961 A1 | 8/2013 | Hagen et al. | |
| 2015/0349380 A1 | 12/2015 | Manthiram et al. | |
| 2016/0218351 A1 | 7/2016 | Dudney et al. | |
| 2016/0301066 A1 | 10/2016 | Ozkan et al. | |
| 2017/0005336 A1 | 1/2017 | Ling | |

FOREIGN PATENT DOCUMENTS

| | | |
|---|---|---|
| JP | 2016512380 A | 4/2016 |
| JP | 2016528678 A | 9/2016 |
| WO | WO-0241416 A2 | 5/2002 |
| WO | WO-2014142953 A1 | 9/2014 |
| WO | WO-2015176028 A1 | 11/2015 |
| WO | WO-2017/011052 A2 | 1/2017 |

OTHER PUBLICATIONS

Stephenson et al. "Lithium Ion Battery Applications of Molybdenum Disulfide ($MoS_2$) Nanocomposites," Energy & Environmental Science, vol. 7, No. 1 Jan. 2014, 23 pages.

European Patent Office, Communication pursuant to Rule 164(1) EPC, Partial Supplementary European Search Report issued for European Patent Application No. 18751759.4, dated Oct. 8, 2020, 11 pages.

International Search Report and Written Opinion issued for PCT Appln. No. PCT/US18/17585, dated May 30, 2018, 12 pages.

Stephenson et al. "Lithium Ion Battery Applications of Molybdenum Disulfide ($MoS_2$) Nanocomposites" Energy Environ. Sci., 2014; vol. 7, 50 pages.

Choudhary et al. "Directly Deposited $MoS_2$ Thin Film Electrodes for High Performance Supercapacitors" J. Mater. Chem. A, 2015; vol. 3. No. 47; 6 pages.

Gong et al. "Metal Contacts on Physical Vapor Deposited Monolayer $MoS_2$," ACS Nano., 2013; vol. 7, No. 12, 8 pages.

Japanese Patent Office, First Office Action issued for Japanese Patent Application No. 2019-543047, dated Dec. 14, 2021, 6 pages with English translation.

* cited by examiner

PASSIVATION OF LITHIUM METAL BY TWO-DIMENSIONAL MATERIALS FOR RECHARGEABLE BATTERIES

CROSS-REFERENCE TO RELATED APPLICATIONS

This application is a national phase application under 35 U.S.C. § 371 of International Application No. PCT/US2018/017585 filed Feb. 9, 2018, which claims priority to U.S. Provisional Patent Application No. 62/457,488 filed Feb. 10, 2017, and U.S. Provisional Patent Application No. 62/526,665 filed Jun. 29, 2017. The entire contents of each of the above-referenced disclosures is specifically incorporated by reference herein without disclaimer.

TECHNICAL FIELD

The present application relates to passivation techniques. More specifically, the present application provides for systems, devices, and methods for creating a battery having a passivation layer to protect its electrodes.

BACKGROUND

There is a growing awareness that current lithium ion battery technologies are reaching their limits in terms of storage and energy capabilities. However, there is still increasing demand for higher energy storage and longer lasting devices. This has challenged the research community to search for next-generation battery systems. Some of the current systems being researched include lithium-air (Li—$O_2$) and lithium-sulfur (Li—S) batteries.

Lithium (Li) metal has been known as the "hostless" material to store Li ions ($Li^+$) without the need for using intercalating and/or conducting scaffold techniques. For this reason, Li metal electrodes exhibit high theoretical specific capacity (3860 mAh $g^{-1}$) and low redox potential (−3.04 V); thus, they are often regarded as the best choice to use for manufacturing/fabricating anodes for next-generation rechargeable Li batteries. However, Li metal anodes exhibit properties that cause multiple practical issues which inhibit their use. These properties are often associated with uncontrollable dendrite formation during repeated Li deposition/dissolution processes, which can lead to short circuiting the battery and potential overheating and fire.

Several techniques have been implemented to suppress Li dendrite growth and/or to enhance stability of Li metal. For example, methods have sought to do this through: controlling the dendrite growth/deposition of Li through liquid electrolyte modification with additives; adopting Li+ conducting polymer or solid state electrolytes; and applying a layer of alumina ($Al_2O_3$) upon the surface of Li metal. A thin layer of $Al_2O_3$ is a ceramic-based material that lacks the electron conductivity of 2D materials, thus increasing internal resistance of the battery electrode. However, none of the approaches has been shown to be effective in the context of rechargeable batteries.

While the low cost and abundance of sulfur make the concept of Li—S batteries alluring, there are several issues that generally prevent the widespread development of Li—S batteries. For example, sulfur is an insulating material, which provides for poor utilization of the active material and hinders electron transfer during the charge/discharge process. In addition, during the discharge process, Li may react with sulfur to form higher-order soluble polysulfides at the cathode, which creates shuttling of polysulfide between the anode and cathode during the cycling process. The shuttle effect may increase the internal resistance of the battery and contribute to capacity fading. Further, the formation of uncontrolled dendrites resulting from uneven deposition of Li metal may cause safety problems at higher C-rates as well as continuous evolution of a porous Li metal structure, which may lead to corrosion of Li metal. While some approaches have been developed, issues of decreased cell efficiency and increased capacity fading still affect the performance of Li—S batteries when used with a Li anode.

SUMMARY

The present application is directed to systems, methods and devices which passivate Li metal with thin layers of 2D materials (e.g., $MoS_2$, $WS_2$, $MoTe_2$, $MoSe_2$, $WSe_2$, BN, BN—C composite, and the like). Two-dimensional (2D) materials, one atomic thickness film, exhibit low impedance due to their unique interlayer structure that readily intercalates Li ions with minimum energy to substantially increase Li-ion diffusivity and electric conductivity while acting as a passivation layer for Li dendrite growth. Such methods may utilize sputtering or evaporation deposition to create the passivation layer. These methods may form a new phase between Li metal and electrolyte where large amounts of Li atoms may be intercalated in order to facilitate homogenous flow of $Li^+$ into and out of bulk Li metal. Unlike other carbon/polymer/ceramic-based protective layers, the unique structural aspects and phase-changing characteristics (e.g., semiconductor and/or metallic traits) of 2D materials such as $MoS_2$, $WS_2$, $MoTe_2$, $MoSe_2$, $WSe_2$, have allowed embodiments of the application to circumvent high impedance and/or poor interfacial-contact related issues. For example, in one embodiment $MoS_2$-coated Li electrodes have demonstrated no Li dendrite growth at a challenging current density over 10 mA $cm^{-2}$ and high capacity retention for over 1000 cycles. The fabricated 2D materials coated Li metal exhibits stable adhesion to the substrate, and yields high cycling stability in 2D materials coated Li metal over bare Li electrode counterparts in rechargeable batteries. Accordingly, embodiments of the present application provide for significant performance improvements in rechargeable batteries.

In an embodiment, a method for passivating lithium metal includes providing a lithium electrode, depositing at least one layer of a two-dimensional material on the lithium electrode, and intercalating the at least one layer of the two-dimensional material with a plurality of lithium ions. In another embodiment, a rechargeable lithium battery includes a first electrode, an electrolyte, and a second electrode, wherein the second electrode comprises a lithium metal having at least one layer of a two-dimensional material deposited thereon.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Figure 1A:
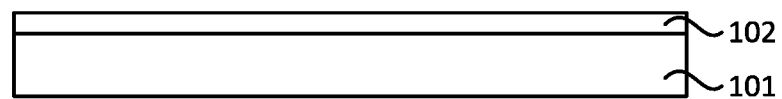
FIG. 1A illustrates a cross-sectional view illustrating a lithium electrode with an interface layer in accordance with an embodiment of the present application.
Figure 1B:
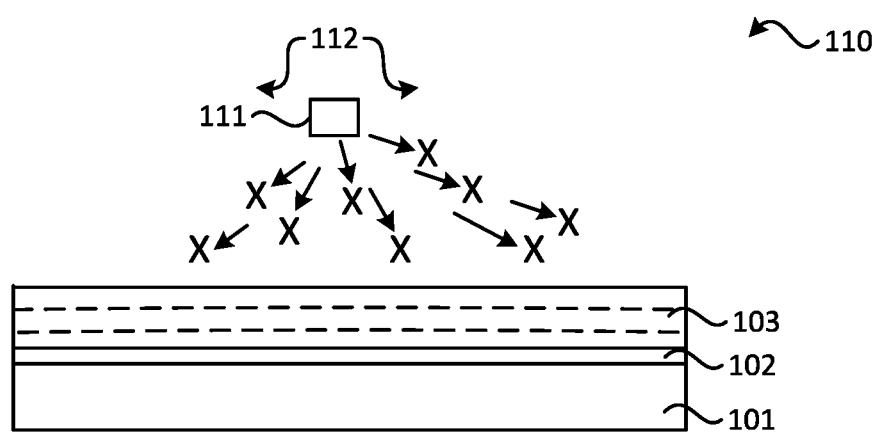
FIG. 1B illustrates aspects of a first fabrication process for passivating a lithium electrode with a two-dimensional material in accordance with an embodiment of the present application.

As illustrated by FIGS. 1A-B, methods for fabricating a 2D material coated Li metal electrode are illustrated in accordance with embodiments of the present application. Referring to FIG. 1A, before deposition of a 2D material, Li metal electrode 101 may be cleaned. Electrode 101 may include ribbon type Li metal, Li metal coated anodes, or the like. In an embodiment, electrode 101 may be cleaned with acetic acid, acetone, isopropyl alcohol, deionized water, or the like. In another embodiment, electrode 101 may be cleaned using a different series of steps and/or cleaning solutions. In certain embodiments, electrode 101 may have an interface layer 102. Interface layer 102 may be inserted to promote adhesion of 2D materials with electrode 101. For example, interface layer 102 may include a plasma (e.g., Ar, He, $H_2$, $N_2$ gas) treated clean surface. In another embodiment, interface layer 102 may include a deposited metallic layer. A metallic layer may be deposited with a thickness of 1.0 nm to 10 nm. In yet another embodiment, interface layer 102 may be a functionalized interface layer. For instance, electrode 101 may be treated in a vacuum with a functional group (e.g., hydrogen, fluorine, C—H bonding).

Next, referring to FIG. 1B, 2D material 103 is deposited on electrode 101 (or electrode 101 with interface layer 102). 2D material 103 may comprise one or more layers of 2D materials such as molybdenum disulfide ($MoS_2$), tungsten disulfide ($WS_2$), molybdenum ditelluride ($MoTe_2$), molybdenum diselenide ($MoSe_2$), tungsten diselenide ($WSe_2$), boron nitride (BN), and/or any other transition metal dichalcogenide monolayer. It is appreciated that different materials may provide for different performance. For example, $MoS_2$ provides strong adhesion to Li metal; it also is readily transformed to metallic phase to reduce impedance. In an embodiment, as illustrated by FIG. 1B, metal 102 (e.g., Mo) is deposited via direct current (DC) sputtering, e-beam evaporation or electro-chemical deposition; subsequently 2D material 103 may be deposited via sputtering. Using target 111 (e.g., any of the aforementioned 2D materials) as the target material for magnetron radio frequency (RF) sputtering, successive layers of 2D materials are sputtered onto electrode 101 to produce a 2D material coated electrode. In an embodiment, sputtering may occur within chamber 110 with base pressure maintained at or below $10^{-6}$ Torr, inert gas flow 112, and RF power at 10-100 W. Inert gas flow 112 may be flowed at 1-100 mTorr and comprise argon, helium, or any other gas that has low reactivity with other substances. In other embodiments, evaporation may be utilized to deposit 2D material 103 on electrode 101. Deposition time may be varied from 1 to 30 minutes to adjust the thickness of 2D material 103.

Figure 2A:
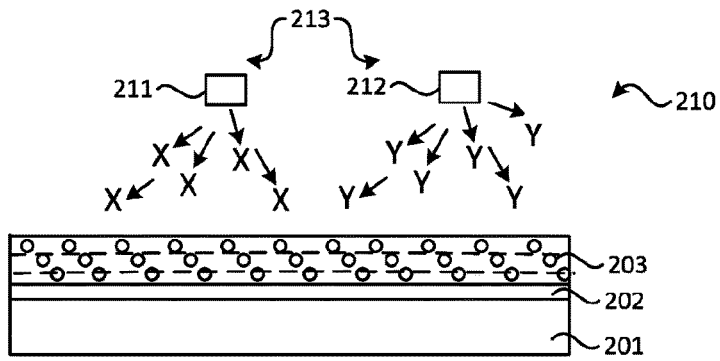
FIG. 2A illustrates aspects of a first fabrication process for intercalating a two-dimensional material on a lithium electrode in accordance with an embodiment of the present application.
Figure 2B:
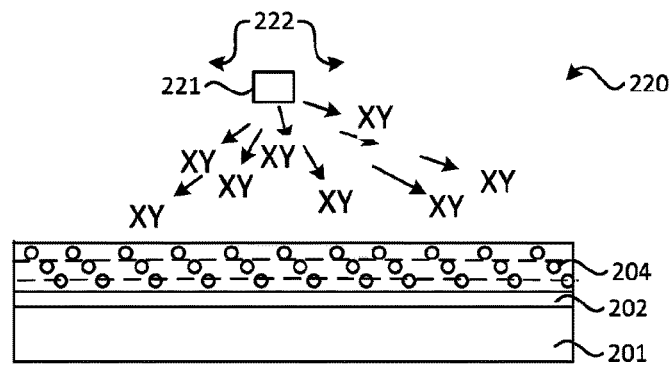
FIG. 2B illustrates aspects of a second fabrication process for intercalating a two-dimensional material on a lithium electrode in accordance with an embodiment of the present application.
Figure 2C:
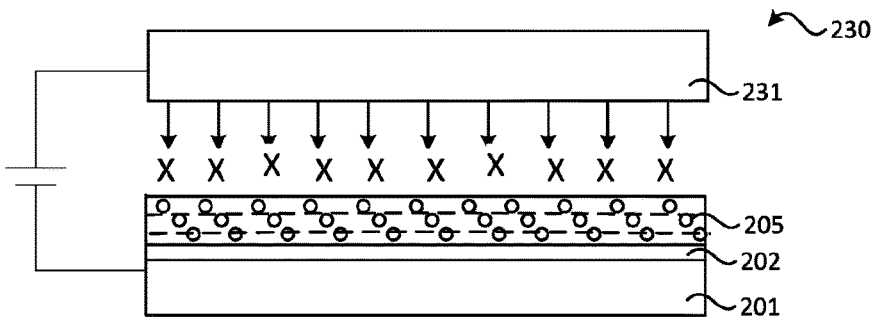
FIG. 2C illustrates aspects of a third fabrication process for intercalating a two-dimensional material on a lithium electrode in accordance with an embodiment of the present application.

FIGS. 2A-C illustrate methods for intercalating 2D material layers in accordance with embodiments of the present application. It is appreciated that in some embodiments, electrode 201 may have an interface layer 202 thereon. FIG. 2A illustrates an embodiment wherein 2D materials and Li-metal are co-sputtered in a vacuum sputtering chamber by two sputtering guns of Li-metal and 2D materials. Using 2D material target 211 and Li target 212 as target materials for sputtering, successive layers of 2D materials and Li are sputtered onto electrode 201, resulting in intercalated 2D material 203. In an embodiment, co-sputtering may occur within chamber 210 with base pressure maintained at or below $10^{-6}$ Torr, inert gas flow 213, and RF power at 10-100 W. Inert gas flow 213 may be flowed at 1-100 mTorr and comprise argon, helium, or any other gas that has low reactivity with other substances. In other embodiments, evaporation may be utilized to deposit intercalated 2D material 203 on electrode 201. Deposition time may be varied from 1 to 30 minutes to vary the thickness of intercalated 2D material 203.

FIG. 2B illustrates another embodiment of a method for intercalating 2D material layers in accordance with an embodiment of the present application, wherein a target is made based on a 2D material/Li composite and sputtered accordingly. 2D material target 221 includes a 2D material and Li metal. In an alternative to the prior embodiment, the combined target is then sputtered, rather than using a co-sputtering method. Using 2D material/Li composite target 221 as a target material for sputtering, successive layers of the 2D material/Li composite are sputtered onto electrode 201, resulting in intercalated 2D material 204. In an embodiment, sputtering may occur within chamber 220 with base pressure maintained at or below $10^{-6}$ Torr, inert gas flow 222, and RF power at 10-100 W. Inert gas flow 222 may be flowed at 1-100 mTorr and comprise argon, helium, or any other gas that has low reactivity with other substances. Deposition time may be varied from 1 to 30 minutes to vary the thickness of intercalated 2D material 204. In other embodiments, evaporation may be utilized to deposit intercalated 2D material 204 on electrode 201.

FIG. 2C illustrates another embodiment wherein 2D material 205 is intercalated electro-chemically. For example, electrode 201 may be deposited with 2D materials according to an embodiment described herein. Electrode 201 may then be introduced into reaction chamber 230, wherein electrode 201 is faced with Li-metal 231 in an electrolyte solution (e.g., 1M lithium bis(trifluoromethanesulfonyl)imide (LiTFSI) in 1:1 DOL/DME solvent). A voltage may then be applied between electrode 201 and Li-metal 231. The applied voltage may be between 1 and 100 V. The distance between electrode 201 and Li-metal 231 may be between 1 and 50 mm. Application of the voltage may then cause Li ions of Li-metal 231 to intercalate the 2D material coated on electrode 201, thereby producing intercalated 2D material 205.

Figure 3A:
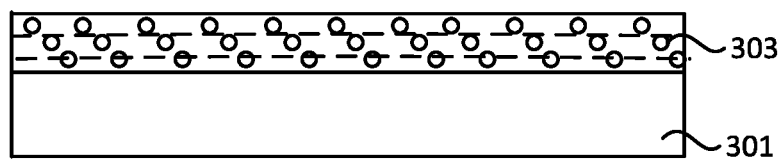
FIG. 3A illustrates a cross-sectional view illustrating a lithium electrode with a two-dimensional material deposited thereon in accordance with an embodiment of the present application.
Figure 3B:
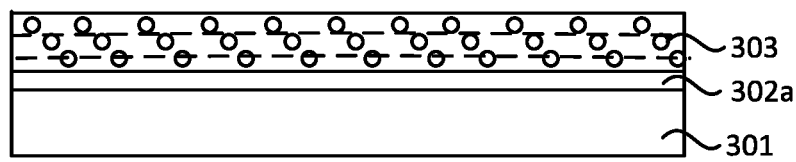
FIG. 3B illustrates a cross-sectional view illustrating a lithium electrode with an interface layer and a two-dimensional material deposited thereon in accordance with an embodiment of the present application.
Figure 3C:
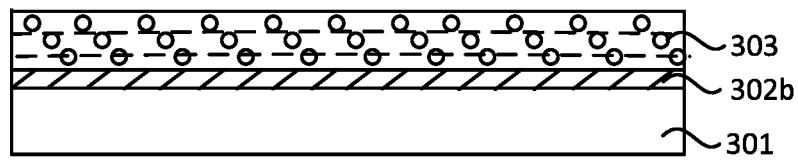
FIG. 3C illustrates a cross-sectional view illustrating a lithium electrode with an alternative interface layer and a two-dimensional material deposited thereon in accordance with an embodiment of the present application.

FIGS. 3A-C illustrate cross-sectional views of a Li electrode with 2D material deposited thereon in accordance with certain embodiments of the present application. In the embodiment depicted in FIG. 3A, the 2D material coated electrode includes electrode 301 and 2D material 303. 2D material 303 may include $MoS_2$, $WS_2$, $MoTe_2$, $MoSe_2$, $WSe_2$, BN, BN—C, or the like. In an embodiment, electrode 301 may first be cleaned and then 2D material may be deposited on electrode 301 (e.g., sputtered, evaporated, etc.). 2D material 303 may also be intercalated with Li ions according to any of the forgoing intercalation methods (e.g., co-sputtering 2D material and Li ions, sputtering a 2D material/Li composite, electro-chemically). It is noted that although particular materials are disclosed as being suitable for providing a 2D coated electrode, such particular materials are disclosed for purposes of illustration, rather than by way of limitation, and materials other than those specifically listed herein may be readily utilized to provide a 2D material coated electrode in accordance with embodiments of the present disclosure. In an embodiment, the material(s) selected for 2D material 303 should tolerate chemicals and temperature cycling which may be required to fabricate electrodes. In certain embodiments, 2D material 303 may have porous morphology that includes cavities, islands, and pores. Porous morphology may be attributed to various conditions (e.g., non-equilibrium atomic stacking by high energetic bombardment during sputtering.). The porous morphology may offer open paths for electrostatic absorption of electrolyte ions and provide electrochemically active sites for dominant double layer charge storage. This could enable faster charging and/or discharging of the stored charge.

Referring now to FIGS. 3B-C, 2D coated Li electrode may have an interface layer in between electrode 301 and 2D material 303 in accordance with certain embodiments of the present application. For example, interface layers can be inserted such that strong adhesion is promoted between 2D material 303 and electrode 301. As illustrated by FIG. 3B, interface layer 302a may include a metallic interface layer deposited by any number of methods (e.g., sputtering, evaporation, etc.) to serve as an interface between 2D material 303 and electrode 301. For example, interface layer 302a may include transition metals such as molybdenum, tungsten, or any other transition metal. Interface layer 302a may be deposited to a certain thickness (e.g., 1-10 nm). As illustrated by FIG. 3C, interface layer 302b may include a functionalized interface layer, e.g., treating electrode 301 with a functional group (e.g., hydrogen, fluorine, C—H bonding, or the like).

Figure 4:
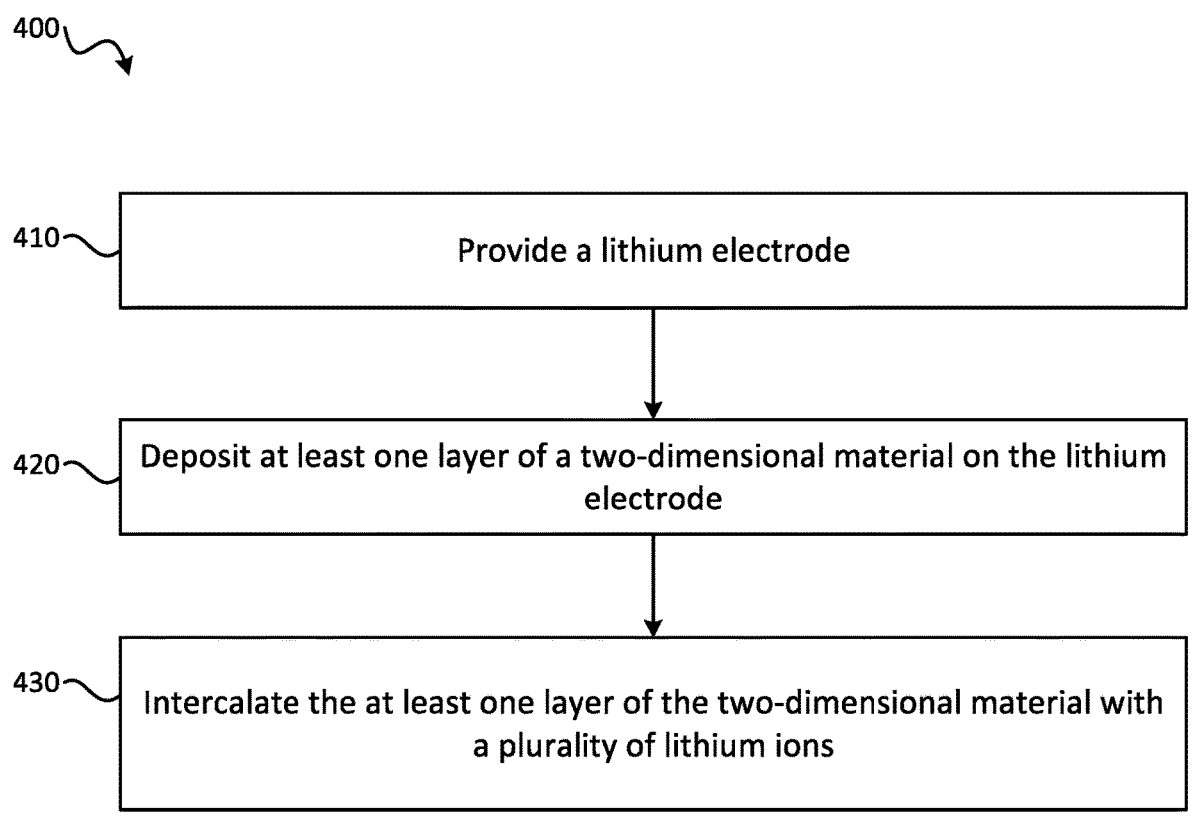
FIG. 4 is a flow diagram of a method for fabricating a lithium electrode with a two-dimensional material thereon in accordance with an embodiment of the present application.

FIG. 4 illustrates method 400 in accordance with an embodiment of the present application. In certain embodiments, method 400 may correspond to the fabrication processes illustrated and described with reference to FIGS. 1A-B and/or FIGS. 2A-C. At block 410, method 400 includes providing a Li electrode. In an embodiment, the Li electrode may include a lithium composite, lithium oxide, lithium sulfide, or the like. In certain embodiments an interface layer may be inserted, which may provide for better adhesion to a 2D material. For example, interface layers may include plasma treated clean surface, metallic layer, and/or a functionalized layer, as described above. At block 420, method 400 includes depositing at least one layer of a 2D material on the Li electrode. The 2D material may include $MoS_2$, $WS_2$, $MoTe_2$, $MoSe_2$, $WSe_2$, BN, BN—C, or the like and be deposited via a number of methods (e.g., sputtering, evaporation, etc.) as described above.

At block 430, method 400 includes intercalating the at least one layer of the 2D material with a plurality of Li ions. In some embodiments, intercalating the 2D material may occur simultaneously with deposition of the electrode and in other embodiments, deposition of the 2D material may occur after deposition of electrode material. In an embodiment, 2D material and Li-metal are co-sputtered in a vacuum sputtering chamber by two sputtering guns of Li-metal and 2D material. Using a 2D material target and a Li target as target materials for sputtering, successive layers of 2D materials and Li are sputtered onto the Li electrode, resulting in the intercalated 2D material. In another embodiment, a target includes a 2D material and Li metal composite. The composite target is then sputtered, rather than using a co-sputtering method. Using the 2D material/Li composite target for sputtering, successive layers of the 2D material/Li composite are sputtered onto the electrode, resulting in an intercalated 2D material. In yet another embodiment, the 2D material may be intercalated electro-chemically. For example, the electrode may be deposited with 2D materials according to an embodiment described herein, then the electrode may be introduced into a reaction chamber faced with Li-metal in an electrolyte solution. Applying a voltage then causes the intercalation of the 2D materials. The resulting 2D materials coated electrode may then be used in a variety of applications, including rechargeable batteries.

Figure 5:
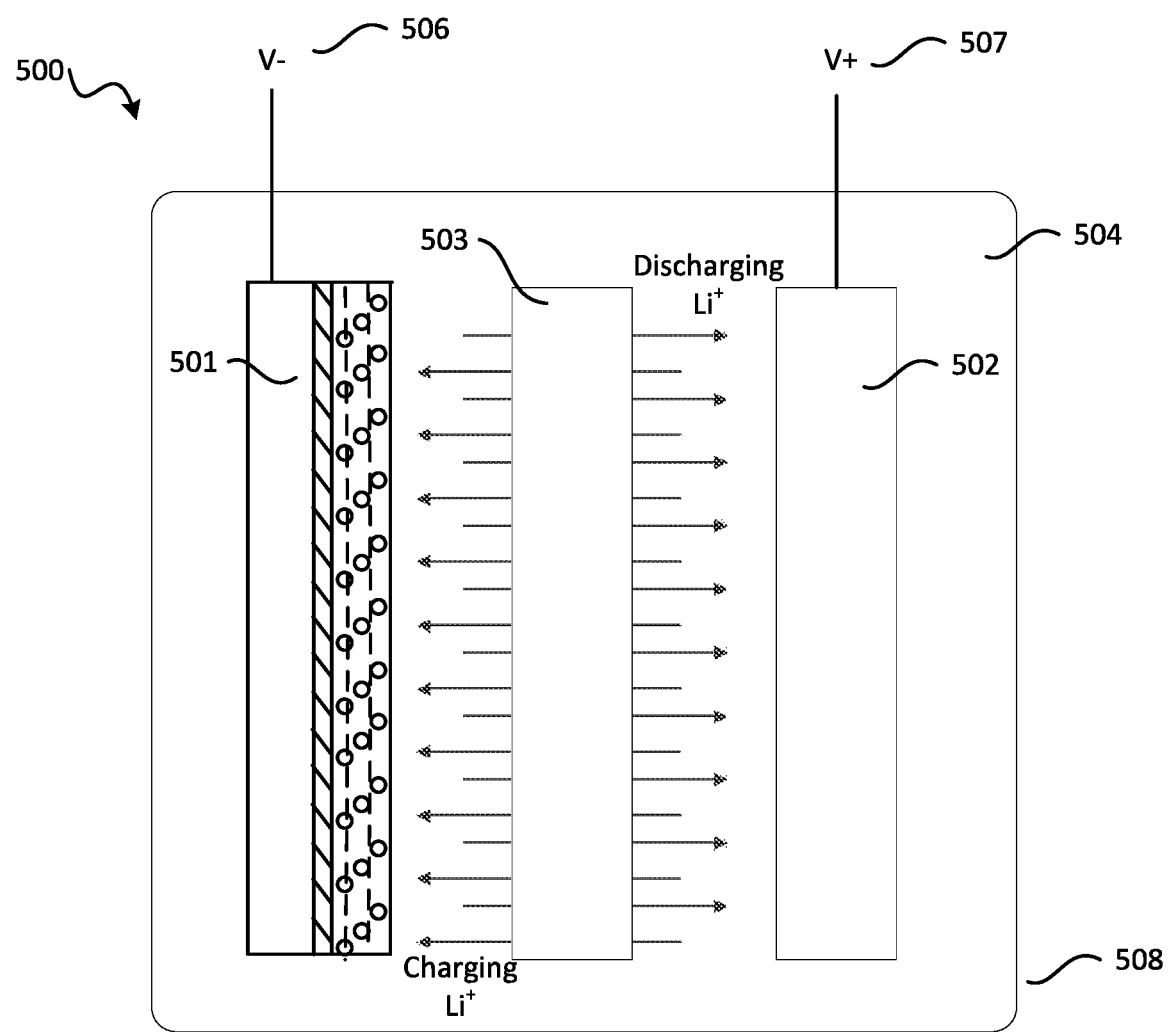
FIG. 5 illustrates a battery system implemented with a two-dimensional material coated lithium electrode in accordance with an embodiment of the present application.

FIG. 5 illustrates a Li-ion battery system in accordance with an embodiment of the present application. In an embodiment, Li-ion battery (LIB) system 500 may include anode 501, cathode 502, separator 503, electrolyte 504, negative terminal 506, positive terminal 507, and casing 508. Anode 501 may include a Li electrode coated with at least one layer of 2D material as described above and illustrated by at least FIGS. 1A-B, 2A-C, and 3A-C. Cathode 502 may include a Li oxide material (e.g., $LiCoO_2$, $LiFePO_4$, $LiMn_2O_4$, $LiNi_xMn_yCo_zO_2$, etc.). In other embodiments, cathode 502 may include a Li electrode coated with at least one layer of 2D material as described above and illustrated by at least FIGS. 1A-B, 2A-C, and 3A-C. Separator 503 may include polypropylene (PP), polyethylene (PE), or the like. Electrolyte 504 may include any number of electrolyte solutions (e.g., aqueous, non-aqueous, etc.) which may allow for transporting Li ions between cathode 502 and anode 501. For example, electrolyte 504 may include various lithium salts (e.g., $LiPF_6$, $LiClO_4$, $LiH_2PO_4$, $LiAlCl_4$, $LiBF_4$, etc.) or other electrolyte material. Current collector 506 may be attached to anode 501 and current collector 507 may be attached to cathode 502. In an embodiment, current collector 506 may include copper metal and current collector 507 may include aluminum metal. Casing 508 may include a variety of cell form factors. For example, embodiments of LIB system 500 may be incorporated in a cylindrical cell (e.g., 13650, 18650, 18500, 26650, 21700, etc.), polymer cell, button cell, prismatic cell, pouch cell, etc. Further, one or more cells may be combined into larger battery packs for use in a variety of applications (e.g., cars, laptops, etc.). In certain embodiments, microcontrollers and/or other safety circuitry may be used along with voltage regulators to manage cell operation and may be tailored to specific uses of LIB system 500.

In one embodiment, LIB system 500 was fabricated using cathode 502 and anode 501 in an argon-filled glove box under low levels of humidity and oxygen (<0.5 ppm). Electrolyte 504 included a 1 M solution of lithium hexafluorophosphate ($LiPF_6$) salt in 1:1:1 (volume ratio) mixture solvent of ethylene carbonate (EC), dimethylene carbonate (DMC), and diethylene carbonate (DEC). Separator 503 included a PP-based membrane. Casing 508 included a CR 2032 coin-cell, assembled with crimping tool. The charge (delithiation) and discharge (lithiation) cycling tests were performed in a multi-channel battery testing unit at room temperature in the voltage window of 0.01-3.0 V.

Figure 6:
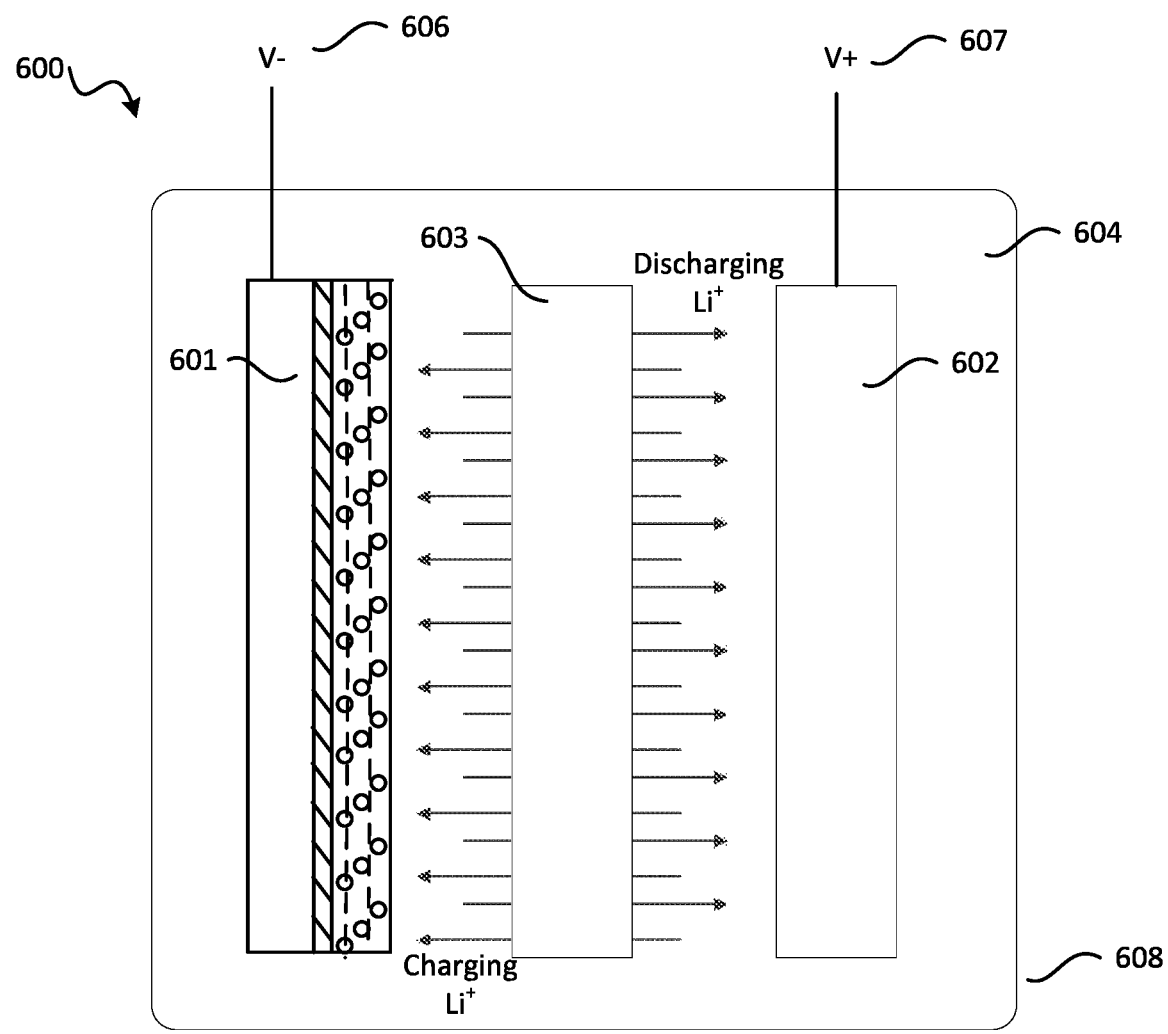
FIG. 6 illustrates an additional battery system implemented with a two-dimensional material coated lithium electrode in accordance with an embodiment of the present application.

FIG. 6 illustrates a lithium-sulfur (Li—S) battery system in accordance with an embodiment of the present application. In an embodiment, Li—S battery system 600 may include anode 601, cathode 602, separator 603, electrolyte 604, negative terminal 606, positive terminal 607, and casing 608. Anode 601 may include a Li electrode coated with at least one layer of 2D material as described above and illustrated by at least FIGS. 1A-B, 2A-C, and 3A-C. Cathode 602 may include sulfur powder as a sulfur electrode and/or a composite with carbon structure (e.g., carbon nanotubes (CNTs), graphene, porous carbon, free-standing 3D CNTs, etc.). Separator 603 may include polypropylene (PP), polyethylene (PE), or the like. Electrolyte 604 may include any number of electrolyte solutions (e.g., aqueous, non-aqueous, etc.) which may allow for transporting Li ions between cathode 602 and anode 601. For example, electrolyte 604 may include 1M LiTFSI in 1:1 DOL/DME with 1% $LiNO_3$ additives or other electrolyte solutions. Current collector 606 may be attached to anode 601 and current collector 607 may be attached to cathode 602. In an embodiment, current collector 606 may include copper metal and current collector 607 may include aluminum metal. Casing 608 may include a variety of cell form factors. For example, embodiments of Li—S battery system 600 may be incorporated in a cylindrical cell (e.g., 13650, 18650, 18500, 26650, 21700, etc.), polymer cell, button cell, prismatic cell, pouch cell, etc. Further, one or more cells may be combined into larger battery packs for use in a variety of applications (e.g., cars, laptops, etc.). In certain embodiments, microcontrollers and/or other safety circuitry may be used along with voltage regulators to manage cell operation and may be tailored to specific uses of Li—S battery system 600.

In one embodiment, Li—S battery system 600 was fabricated inside an argon filled glove box constantly maintaining humidity ($H_2O$) and oxygen ($O_2$) concentration less than 0.5 ppm. The electrochemical performance of cathode 602 (BF 3D-CNTs-S cathode material) was evaluated by a multi-channel battery testing unit in a coin cell with lithium serving as a counter/reference. The size of cathode 602 was 1 cm×1 cm (1 $cm^2$) with a square geometry. Electrolyte 604 was prepared by dissolving lithium bis-trifluoromethanesulphonylimide (LITFSI, 99% sigma Aldrich, 1M) and lithium nitrate ($LiNO_3$, 99.99%, sigma Aldrich, 0.25M) salt in the organic solvent of 1,2-dimethoxyethane (DME, 99.5%, sigma Aldrich), and 1,3-dioxolane (DOL, 99%, sigma Aldrich) with 1:1 volumetric ratio. Electrolyte 604 added to the coin cell was optimized to a volume of 60 μL. Separator 603 included polypropylene (PP) to isolate anode 601 and cathode 602. A galvanostatic charge-discharge test was carried out at room temperature within a voltage range of 1.5-3.0 V. The C-rate was calculated based on the theoretical specific capacity of sulfur ((Qs=2×9.65×104/(3.6×32.065))

~1672 mAh/g). The cyclic voltammetry and electrochemical impedance spectroscopy (EIS) measurement were performed by a potentiostat.

Figure 7:
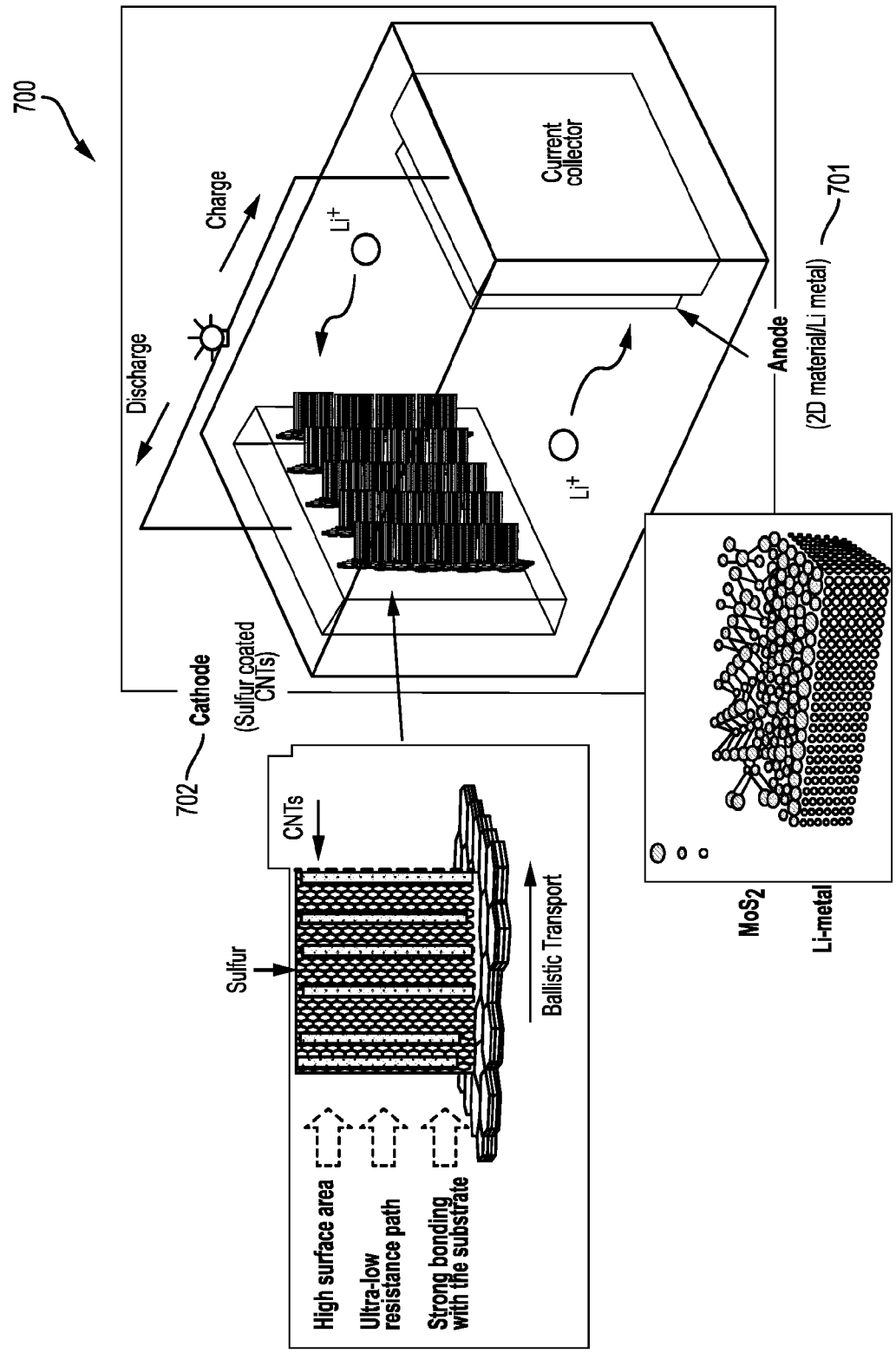
FIG. 7 illustrates a battery system implemented with a three-dimensional carbon nanotube sulfur cathode and two-dimensional material coated lithium anode in accordance with an embodiment of the present application.

FIG. 7 illustrates Li—S battery system 700 in accordance with an embodiment of the present application. In an embodiment, Li—S battery system 700 may include anode 701 and cathode 702. Anode 701 may include a Li electrode coated with at least one layer of 2D materials as described above and illustrated by at least FIGS. 1A-B, 2A-C, and 3A-C. For example, anode 701 is illustrated by FIG. 7 as comprising Li metal with one or more layers of $MoS_2$ deposited thereon. As discussed above, anode 701 may be formed by direct deposition of one or more layer of 2D materials (e.g., $MoS_2$ and the like) onto Li metal via sputtering, evaporation, and the like. One or more layer of 2D materials may be uniform and provide negligible impedance such that cells may operate at high current densities with low polarization. In an embodiment, the lithiated $MoS_2$ may be edge-oriented flake-like $MoS_2$, which may provide a consistent flow of $Li^+$ into and out of the bulk Li metal, a homogenous and stable Li electrodeposition, and suppression of dendrite formation.

In an embodiment, cathode 702 may include a 3D CNTs/S electrode. As shown in FIG. 7, cathode 702 may comprise a substrate (e.g., graphene) with a plurality of CNTs thereon, which will be discussed in more detail below. The plurality of CNTs may be coated in sulfur, providing large surface area, an ultra-low resistance path, and strong bonding with a substrate. In one embodiment, initial data of 3D CNTs/S cathode 702 demonstrated sulfur loading of >8 mg/cm². In another embodiment including 2D materials coated Li-metal anode 701 and 3D CNTs/S cathode 702, specific capacity was 1100 mAh/g (e.g., >500 Wh/kg) at 0.5° C. with over 1000 charge/discharge cycles.

Figure 8:
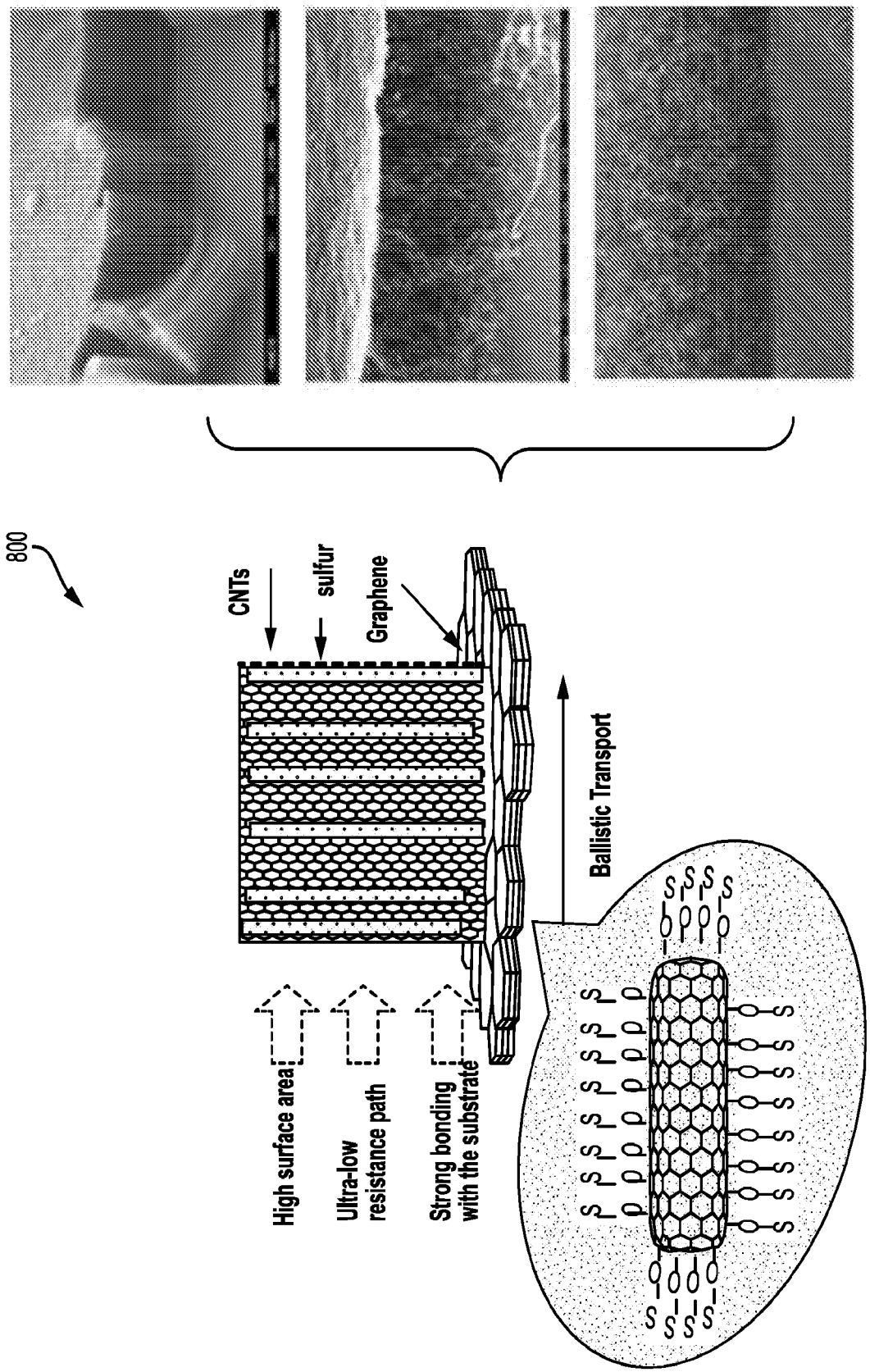
FIG. 8 illustrates a cross-sectional view of an electrode structure and corresponding SEM images in accordance with an embodiment of the present application.

FIG. 8 illustrates a cross-sectional view of an electrode 800 and corresponding SEM images in accordance with an embodiment of the present application. Electrode 800 may include a porous 3D CNTs structure (e.g., a plurality of CNTs), which provides a high conduction path and short diffusion length for Li-ions and the ability to absorb polysulfides generated during the cycling process. High loading of CNTs may be achieved by multi-stacking one or more 3D CNTs layers while maintaining structural integrity and conductivity. In an embodiment, treatment of a CNTs surface with a functional group may enhance the bonding strength between CNTs and sulfur (e.g., oxygen terminated CNTs have higher bonding strength with sulfur) such that polysulfide shuttle effect is minimized, as will be discussed in more detail below.

In one embodiment, in a 3-D micro-channeled electrode in a rechargeable battery, the 3D Cu mesh demonstrated surface area improvement of approximately 10 times that of 2D Cu foil, and the loading of CNTs may be increased (e.g., >50 times with a sample of 500 nm thickness). In an embodiment, electrode 800 may be scalable for various high-energy applications and energy storing technologies. For example, the weight of other battery components is a concern for various applications. In an embodiment, energy/power density and/or specific capacity of a battery may be normalized with the total mass of the battery and/or packaging density. Carbon nanotubes in a 3D structure provide more efficient and versatile energy storage for a variety of platforms.

Figure 9:
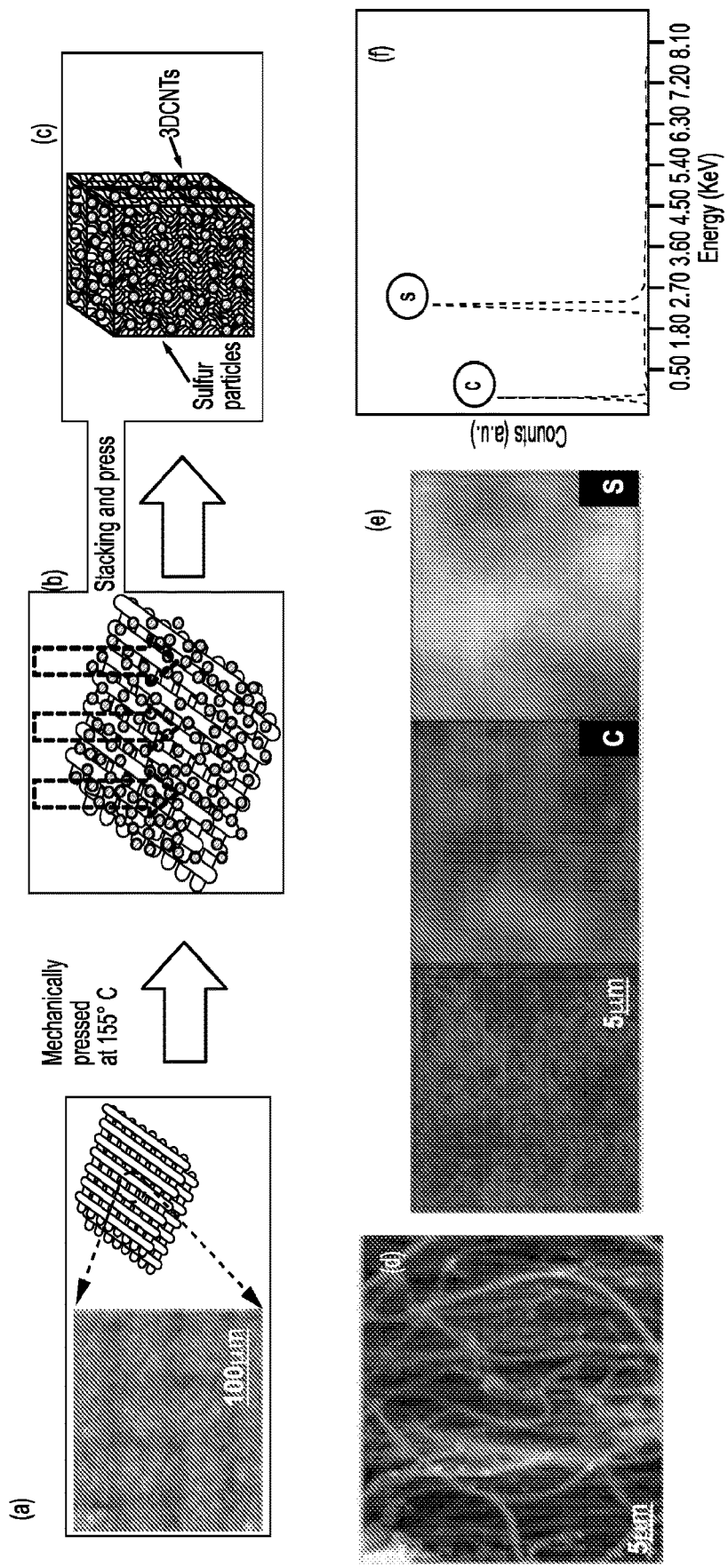
FIG. 9 illustrates a fabrication process for an electrode in accordance with an embodiment of the present application.

FIG. 9 illustrates aspects of a fabrication process for an electrode in accordance with an embodiment of the present application. In an embodiment, a binder-free 3D CNTs/S cathode structure may be fabricated. FIG. 9 at (a) illustrates a plurality of free-standing 3D CNTs and corresponding low magnification SEM image demonstrating same. As shown at (b) of FIG. 9, an embodiment may include uniformly coating one or more layers of sulfur onto 3D CNTs (e.g., via mechanically pressing at ~155° C.). The sulfur particles may be uniformly distributed and mechanically pressed to facilitate confinement of sulfur melt into the 3D CNTs structure by capillary action and low surface tension. FIG. 9 at (c) illustrates a schematic showing the resulting distribution of sulfur particles into the 3D CNTs. Section (d) illustrates a cross-sectional SEM image of highly dense 3D CNTs. The interconnected CNTs provide large surface area (e.g., >100 m²/g) and narrow pore size distribution (e.g., 2-20 nm). FIG. 9 at (e) illustrates a SEM image of as-synthesized binder-free 3D CNTs/S along with corresponding carbon and sulfur EDS mapping. Section (f) illustrates energy-dispersive X-ray (EDX) spectrum of the SEM image shown at (e). The average diameter of these CNTs may range from 100-150 nm. The SEM image (e) and EDX spectrum (f) of an exemplary fabricated 3D CNTs/S cathode demonstrates uniform distribution of sulfur within the conductive network of 3D CNTs.

In one embodiment, a binder-free 3D CNTs/S electrode was fabricated according to the above exemplary process. The binder free cathode design resulted in high sulfur loading of 8.33 mg/cm² (~55 wt % S in the cathode electrode) with high areal capacity of 8.89 mAh/cm² and specific capacity of 1068 mAh/g at 0.1 C rate (~1.4 mA/cm²), providing coulombic efficiency of greater than 95% for 150 cycles. The embodiment exhibited specific energy of ~1233 Wh/kg with a specific power of ~476 W/kg, with respect to the mass of the cathode.

Figure 10A:
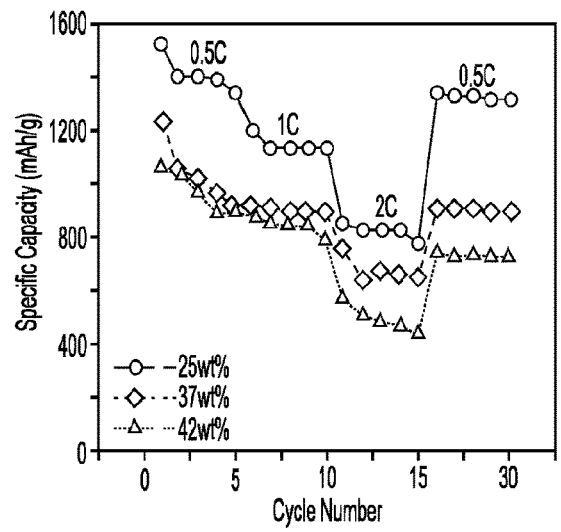
FIG. 10A illustrates a graph of cycle rate and capacity of an electrode with various sulfur loading amounts in accordance with an embodiment of the present application.
Figure 10B:
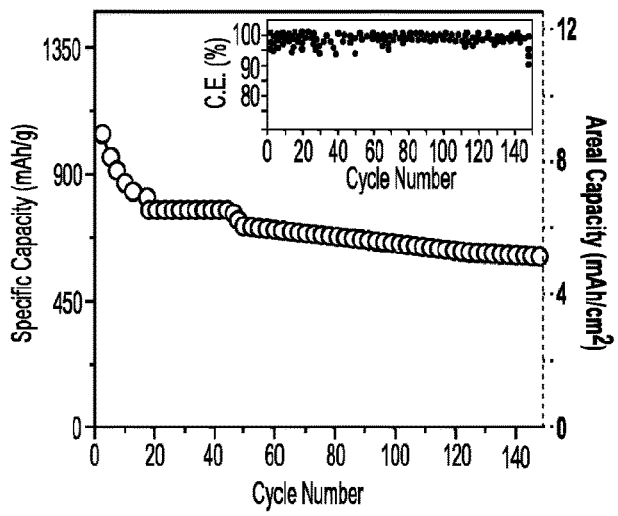
FIG. 10B illustrates an additional graph of cycle rate and capacity of an electrode in accordance with an embodiment of the present application.
Figure 10C:
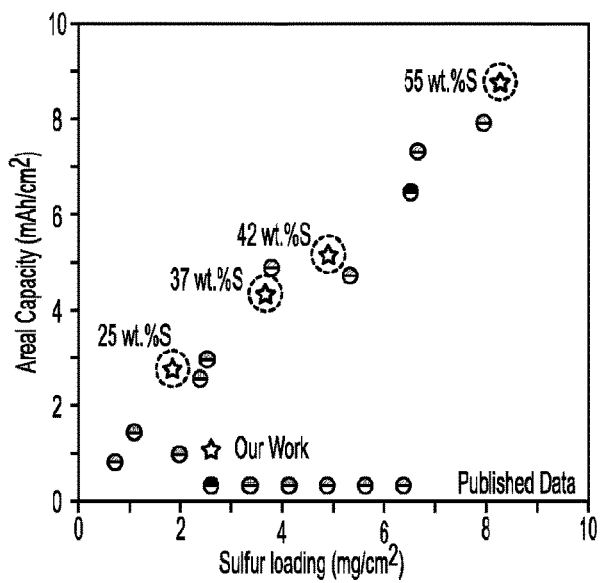
FIG. 10C illustrates a graph of areal capacity of an electrode in accordance with an embodiment of the present application.

FIG. 10A and FIG. 10B illustrate graphs depicting number of cycles versus specific capacity of an electrode with various sulfur loading amounts in accordance with an embodiment of the present application. For instance, FIG. 10A illustrates rate capability of an exemplary cell with different sulfur loading amounts. Further, FIG. 10B illustrates cycling performance of high sulfur loading amount of 55 wt % S (8.33 mg/cm2) sulfur loaded within 3D CNTs. FIG. 10C illustrates a graph of areal capacity of a 3D CNTs/S electrode in accordance with an embodiment of the present application. FIG. 10C illustrates a comparison of areal capacity for a binder-free 3D CNTs/S electrode with that of conventional Li—S battery cathode material, demonstrating that an exemplary binder-free 3D CNTs/S cathode structure may achieve higher areal capacity.

The galvanostatic discharge-charge profiles corresponding to FIG. 10A demonstrate plateaus for all C-rates (e.g., indicating efficient kinetic process with high electrical conductivity within the matrix of 3D CNTs/S structure). Improved reaction kinetics are also demonstrated from the discharge capacity ratio between the lower ($Q_{lower-plateau}$) and upper plateaus ($Q_{upper-plateau}$). For example, FIG. 10A demonstrates the $Q_{lower-plateau}/Q_{upper-plateau}$ ratio at 2 C rate for both 37 wt % S and 42 wt % S that are 1.85 and 1.8, respectively, indicating an efficient conversion of soluble polysulfides to non-soluble sulfides at higher C-rates. FIG. 10A illustrates specific capacity from a high sulfur loading amount of 55 wt % S (8.33 mg/cm²) and the cell delivered initial discharge capacity of ~1068 mAh/g at 0.1 C (~1.39 mA/cm²) corresponding to an areal capacity of ~8.8 mAh/cm² (e.g., higher than conventional Li—S batteries). In an embodiment, after 150 cycles, a cell could still deliver specific capacity of ~613 mAh/g with an average capacity decay of ~0.4% per cycle, (e.g., superior to previously reported data shown in FIG. 10C).

Figure 11A:
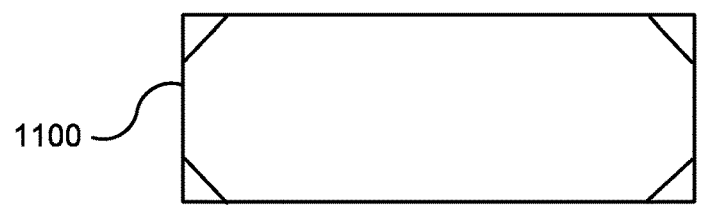
FIG. 11A illustrates an exemplary carbon nanotube structure on three-dimensional metal mesh in accordance with an embodiment of the present application.
Figure 11B:
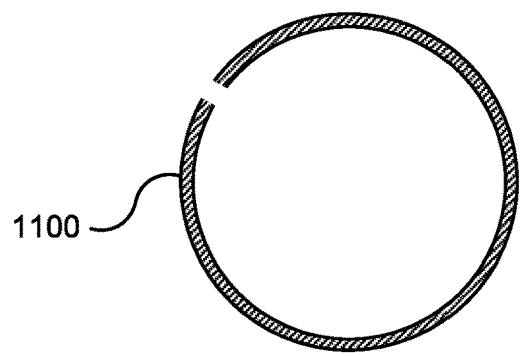
FIG. 11B illustrates an exemplary carbon nanotube structure on three-dimensional metal mesh in accordance with an embodiment of the present application.
Figure 11C:
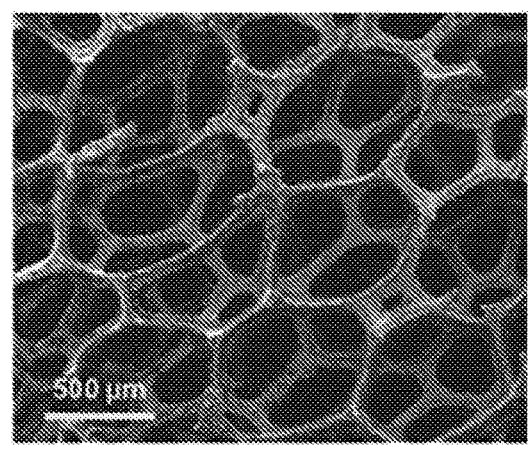
FIG. 11C illustrates an exemplary carbon nanotube structure on three-dimensional metal mesh in accordance with an embodiment of the present application.
Figure 11D:
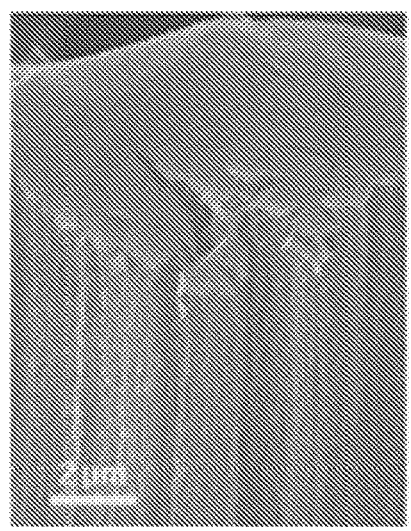
FIG. 11D illustrates an exemplary carbon nanotube structure on three-dimensional metal mesh in accordance with an embodiment of the present application.

FIGS. 11A-B illustrate a flexible 3D metal mesh with a plurality of CNTs thereon in accordance with an embodiment of the present application. FIGS. 11A-B illustrate an embodiment of CNTs on a 3D metal mesh configured such that the embodiment may be scalable and bendable. Further, FIGS. 11C-D illustrate SEM images of the embodiment demonstrating CNTs on a porous metal mesh structure. An embodiment may be fabricated using CVD of 3D CNTs on a 3D Cu-mesh, and/or any of the fabrication methods discussed herein. It is appreciated that the scalable and bendable structure may be utilized as an electrode in embodiments of Li—S batteries discussed herein, such that a bendable and scalable electrode may be easily adapted to a large variety of shapes, sizes, applications, and the like.

Figure 12:
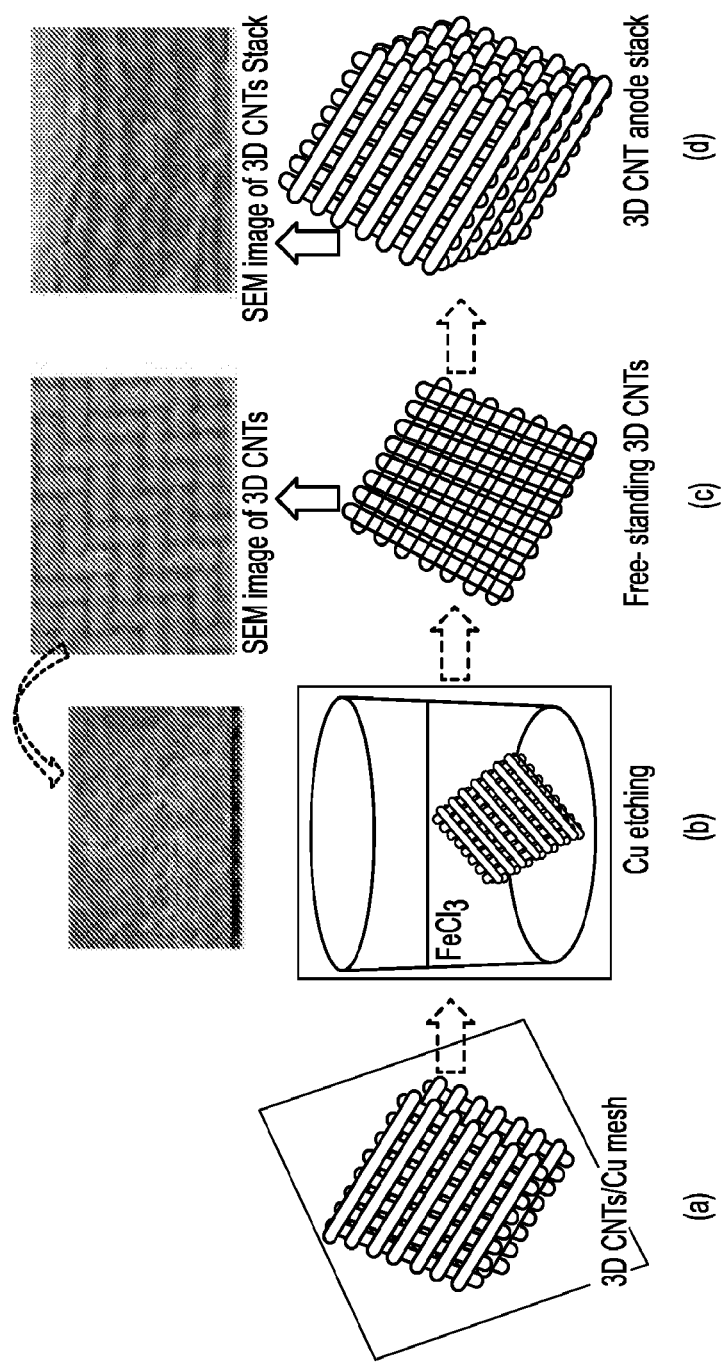
FIG. 12 illustrate aspects of a fabrication process of an electrode in accordance with an embodiment of the present application.

FIG. 12 illustrates aspects of a fabrication process of a 3D CNTs anode stack in accordance with an embodiment of the present application. Referring to FIG. 12 at (a), in an embodiment, a plurality of 3D CNTs may be grown on a mesh structure (e.g., Cu, graphene, and the like) via CVD and/or other deposition methods discussed herein. For example, a Cu mesh structure (e.g., <200 mesh) may include an average thickness of 50-200 µm and first be cleaned ultrasonically with a sequence of acetone, ethanol, deionized water and the like. The clean Cu mesh structure may then be dried in an oven. In an embodiment, a titanium buffer layer and nickel catalyst may be deposited on the Cu mesh (e.g., using RF magnetron sputtering) at room temperature with varying deposition time (e.g., 1-15 min.) at a given deposition pressure (e.g., $10^{-3}$ Torr Ar). Next, the 3D CNTs may be synthesized in a thermal CVD system. Growth of highly dense and aligned CNTs may be optimized by using ethylene gas (e.g., 50-150 SCCM) and hydrogen carrier gas (e.g., 10-100 SCCM) at a temperature of 600-800° C. for 10-60 min.

Referring now to FIG. 12 at (b), the mesh structure with 3D CNTs may be introduced to an etching process. For example, a CNTs/Cu mesh structure may be etched in a $FeCl_3$ etching solution, resulting in a free-standing 3D CNTs structure as illustrated at (c). Further, one or more layers of 3D CNTs may be fabricated by pressing the layers of 3D CNTs by a hot-press to create a multi-stack 3D CNTs (shown at (d)), which may then be utilized as an electrode (e.g., cathode, anode, and the like).

Polysulfide dissolution into the electrolyte may contribute to capacity degradation in Li—S batteries. In an embodiment, to mitigate polysulfide shuttle effect, CNTs surfaces may be treated with functional groups (e.g., oxygen terminated CNTs and the like) to enhance the bonding strength between CNTs and sulfur. For example, a stabilization method of sulfur with CNTs may include introducing functional groups (e.g., carboxylic acids, amines, ketones, alcohol, esters, and the like). Chemical functionalization is based in part on the covalent bond of functional groups with the surface of CNTs as well as the end caps of nanotubes. In an embodiment, oxidation treatment of CNTs with strong acids such as $HNO_3$, $H_2SO_4$, and/or a mixture of both with strong oxidants (e.g., $KMnO_4$ and the like) may form oxygenated functional groups. In another embodiment, non-covalent interaction with the active molecules may provide for tuning the interfacial properties of CNTs/S. The CNTs may be functionalized non-covalently by aromatic compounds, surfactants, polymers, and/or hydrophobic interactions.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A method for passivating lithium metal, the method comprising:
   providing a lithium electrode; and
   forming a passivation layer on the lithium electrode, wherein forming the passivation layer comprises:
      depositing at least one layer of a two-dimensional material on the lithium electrode; and
      intercalating the at least one layer of the two-dimensional material with a plurality of lithium ions to form at least one layer of lithium ion-intercalated two-dimensional material on the lithium electrode, wherein intercalating the at least one layer of the two-dimensional material with the plurality of lithium ions results in insertion of at least some of the plurality of lithium ions within the at least one layer of the lithium ion-intercalated two-dimensional material, and wherein the plurality of lithium ions originate from a material that is different from the lithium electrode.

2. The method of claim 1, wherein the two-dimensional material is selected from a group consisting of: $MoS_2$, $WS_2$, $MoTe_2$, $MoSe_2$, $WSe_2$, BN, and BN—C.

3. The method of claim 1 further comprising:
   inserting at least one interface layer, wherein the at least one interface layer is configured to be in between the lithium electrode and the at least one layer of the lithium ion-intercalated two-dimensional material.

4. The method of claim 3, wherein the at least one interface layer includes a plasma treated clean surface.

5. The method of claim 3, where in the at least one interface layer includes a metallic interlayer with a thickness less than 10 nm.

6. The method of claim 3 wherein the at least one interface layer is a functionalized interlayer.

7. The method of claim 1 wherein the depositing includes at least one selected from the group consisting of sputtering and evaporation.

8. The method of claim 1 wherein the intercalating further comprises:
   providing a first target comprising the two-dimensional material;
   providing a second target comprising lithium metal for the material that is different from the lithium electrode; and
   simultaneously sputtering the first target and the second target onto the lithium electrode to form the at least one layer of the lithium ion-intercalated two-dimensional material.

9. The method of claim 1 wherein the intercalating further comprises:
   providing a target comprising a two-dimensional material-lithium composite; and
   sputtering the target onto the lithium electrode to form the at least one layer of the lithium ion-intercalated two-dimensional material.

10. The method of claim 1 further comprising:
    providing a cathode;
    forming a plurality of carbon nanotube structures on the cathode; and
    depositing a plurality of sulfur particles on the plurality of carbon nanotube structures; and
    disposing the lithium electrode having the passivation layer and the cathode in an electrolyte solution.

11. A battery comprising:
    a positive terminal;
    an anode connected to the positive terminal, the anode including a lithium electrode coated with at least one layer of a lithium ion-intercalated two-dimensional material which is intercalated with a plurality of lithium ions from a different source than the lithium electrode, wherein the at least one layer of the lithium ion-intercalated two-dimensional material forms a passivation layer;
    a separator layer;
    a cathode including a plurality of carbon nanotube structures having a plurality of sulfur particles disposed thereon; and
    a negative terminal connected to the cathode.

12. The battery of claim 11 wherein the carbon nanotube structures are 3D carbon nanotube structures.

13. The battery of claim 11 wherein the cathode comprises a graphene substrate with a plurality of sulfur-coated carbon nanotube structures bonded to the graphene substrate.

14. The battery of claim 11 wherein the separator layer comprises at least one selected from the group consisting of a polypropylene and polyethylene layer.

15. The battery of claim 11 wherein the anode and cathode are disposed within an electrolyte solution.

16. The battery of claim 15 wherein the electrolyte solution is a non-aqueous solution.

17. The battery of claim 11 further comprising one or more current collectors.

18. The battery of claim 17 wherein the one or more current collectors comprises at least one aluminum metal collector and at least one copper metal collector.

19. The battery of claim 11 wherein the at least one layer of the lithium ion-intercalated two-dimensional material on the lithium electrode includes one or more molybdenum disulfide ($MoS_2$) layers.

20. The battery of claim 19 wherein the at least one layer of the lithium ion-intercalated two-dimensional material on the lithium electrode further includes at least one layer selected from: tungsten disulfide ($WS_2$), molybdenum ditelluride ($MoTe_2$), molybdenum diselenide ($MoSe_2$), tungsten diselenide ($WSe_2$), boron nitride (BN), and a transition metal dichalcogenide monolayer.

* * * * *

UNITED STATES PATENT AND TRADEMARK OFFICE
CERTIFICATE OF CORRECTION

PATENT NO. : 11,355,739 B2  
APPLICATION NO. : 16/482372  
DATED : June 7, 2022  
INVENTOR(S) : Wonbong Choi et al.

Page 1 of 1

It is certified that error appears in the above-identified patent and that said Letters Patent is hereby corrected as shown below:

In the Specification

At Column 1, Line number 38, delete "(3860 mAh g$^{-1}$)" and replace with --(~3860 mAh g$^{-1}$)--.

Signed and Sealed this  
Ninth Day of August, 2022

Katherine Kelly Vidal  
*Director of the United States Patent and Trademark Office*